(12) United States Patent
Burks et al.

(10) Patent No.: US 11,048,346 B1
(45) Date of Patent: Jun. 29, 2021

(54) DIGITAL PENS WITH CAMERAS FOR VIDEOCONFERENCING

(71) Applicant: HEWLETT-PACKARD DEVELOPMENT COMPANY, L.P., Houston, TX (US)

(72) Inventors: Ricky Thomas Burks, Houston, TX (US); Tony Moon, Houston, TX (US)

(73) Assignee: Hewlett Packard Development Company, L.P., Spring, TX (US)

( * ) Notice: Subject to any disclaimer, the term of this patent is extended or adjusted under 35 U.S.C. 154(b) by 554 days.

(21) Appl. No.: 16/076,509

(22) PCT Filed: Apr. 18, 2017

(86) PCT No.: PCT/US2017/028041
§ 371 (c)(1),
(2) Date: Aug. 8, 2018

(87) PCT Pub. No.: WO2018/194557
PCT Pub. Date: Oct. 25, 2018

(51) Int. Cl.
*G06F 3/033* (2013.01)
*G06F 3/0354* (2013.01)
*G06F 1/16* (2006.01)

(52) U.S. Cl.
CPC ........ *G06F 3/03545* (2013.01); *G06F 1/1616* (2013.01); *G06F 1/1686* (2013.01); *G06F 2200/1632* (2013.01)

(58) Field of Classification Search
CPC .. G06F 1/1616; G06F 1/1686; G06F 3/03545; G06F 2200/1632
See application file for complete search history.

(56) References Cited

U.S. PATENT DOCUMENTS

| 7,961,917 | B2 | | 6/2011 | Black |
| 9,329,703 | B2 | | 5/2016 | Falkenburg et al. |
| 9,400,570 | B2 | | 7/2016 | Chang |
| 9,507,381 | B1 | | 11/2016 | Vanderet et al. |
| 10,139,926 | B2 | * | 11/2018 | Murauyou .......... G06F 3/03545 |
| 10,153,077 | B2 | * | 12/2018 | Barel .................... G06F 1/1607 |
| 10,466,815 | B2 | * | 11/2019 | Shida ...................... G06F 3/038 |
| 2004/0056949 | A1 | * | 3/2004 | Lin ........................ B43K 29/00 348/61 |
| 2008/0013262 | A1 | | 1/2008 | Stanford et al. |

(Continued)

FOREIGN PATENT DOCUMENTS

| AU | 2015230757 | | 10/2015 |
| EP | 2818981 | A1 | 12/2014 |
| GB | 2446612 | | 8/2008 |

OTHER PUBLICATIONS

Ramsundar, "Interactive Touch Board Using IR Camera", 2nd International Conference on Electronics and Communication Systems (ICECS), Retrieved from Internet: http://ieeexplore.ieee.org/document/7124874, 2015, 2 Pages.

*Primary Examiner* — Joe H Cheng
(74) *Attorney, Agent, or Firm* — HPI Patent Department

(57) ABSTRACT

Examples disclosed herein provide a digital pen for a computing device. As an example, the digital pen includes a barrel, a camera mounted along a length of the barrel, and a first set of magnetic members to magnetically couple to a second set of magnetic members of a computing device. Upon the first and second sets of magnetic members magnetically coupling with each other, the camera is to activate for use with the computing device for videoconferencing.

15 Claims, 3 Drawing Sheets

(56) References Cited

U.S. PATENT DOCUMENTS

| | | |
|---|---|---|
| 2013/0162589 A1 | 6/2013 | Lien |
| 2013/0163977 A1* | 6/2013 | Mack .................. H04N 5/2254 |
| | | 396/428 |
| 2014/0253464 A1 | 9/2014 | Hicks et al. |
| 2015/0372505 A1* | 12/2015 | Takahashi ............... H02J 5/005 |
| | | 307/104 |
| 2017/0102739 A1 | 4/2017 | Zaloom |

* cited by examiner

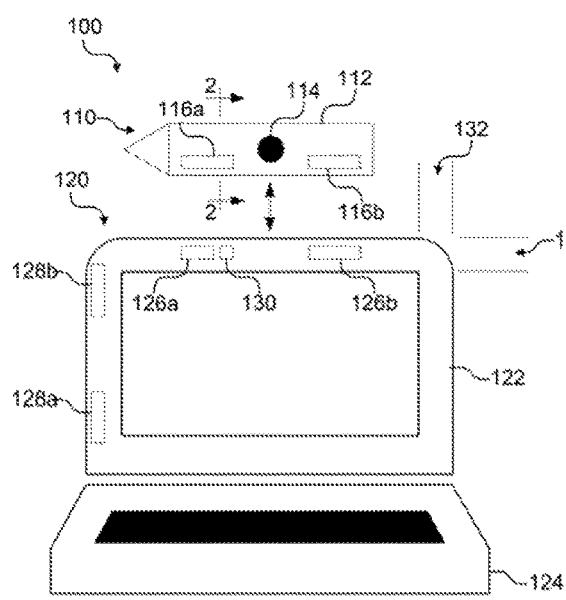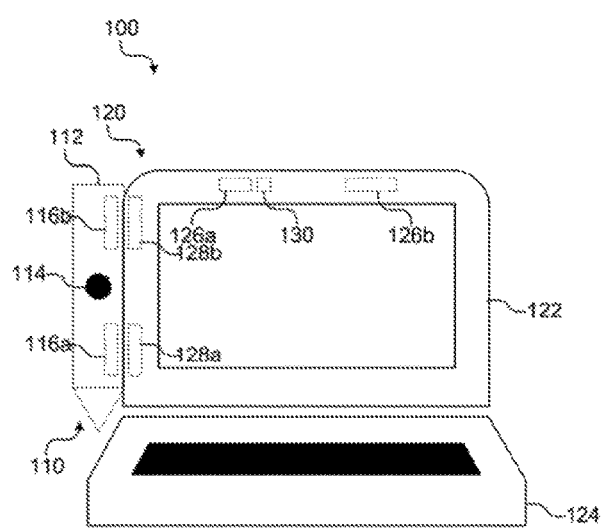
FIG. 1A
FIG. 1D

DIGITAL PENS WITH CAMERAS FOR VIDEOCONFERENCING

This is the U.S. National Stage of International Patent Application No. PCT/US2017/028041, filed Apr. 18, 2017, the entire contents of which are incorporated herein by reference.

BACKGROUND

The emergence and popularity of mobile computing has made portable computing devices, due to their compact design and light weight, a staple in today's marketplace. Computing devices, such as notebook computers and tablet computers, generally include a display member that is utilized to provide a viewable display to a user. The viewable display may be a touchscreen, allowing the user to interact directly with what is displayed by touching the screen with simple or multi-touch gestures. As an example, an input device, such as a digital pen, may be used with a computing device, to capture handwriting or brush strokes of a user. The computing device may convert handwritten analog information, provided by the digital pen, into digital data, enabling the data to be utilized in various applications on the computing device.

BRIEF DESCRIPTION OF THE DRAWINGS

FIGS. 1A-D illustrate a system that includes a computing device and a digital pen with a camera that may be used with the computing device for videoconferencing, according to an example;

DETAILED DESCRIPTION

Figure 1B:
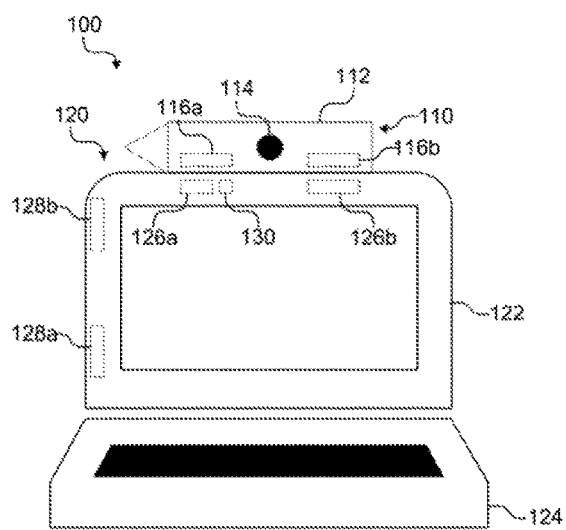

Examples disclosed herein provide a digital pen with a camera to be used with a computing device for videoconferencing. As an example, videoconferencing enables remotely located users at different sites to simultaneously collaborate with one another via interactive audio/video transmissions. A user at one location can see and interact with users at other locations in real-time and without noticeable delay. By making a camera available on the digital pen, the bezel of a display member of the computing device may be reduced by removing hardware relating to a webcam. Reduction in the bezel of the display member may be desirable for aesthetic purposes, and also to increase the surface area of the viewable display.

With reference to the figures, FIGS. 1A-D illustrate a system 100 that includes a computing device 120 and a digital pen 110 with a camera 114 that may be used with the computing device 120 for videoconferencing, according to an example. As will be further described, the camera 114 may be activated only when the digital pen 110 is to magnetically couple to certain areas of the computing device 120, thereby avoiding security concerns involved with camera hacking, where a user of the computing device 120 may be inadvertently recorded by a malicious source via the camera 114. Similar to how the digital pen 110 may be wirelessly connected to the computing device 120 to capture handwriting or brush strokes of a user, for example, via Bluetooth, the camera 114 may be wirelessly connected to be used by the computing device 120, when the digital pen 110 is to magnetically couple to the certain areas of the computing device 120. However, as an example, the camera 114 may rather activate only after a direct wired connection between the digital pen 110 and the computing device 120, as will be further described.

As an example, the computing device 120 may be a notebook computer, with a display member 122 that is rotatably connected to a base member 124. However, the computing device 120 is not limited to a notebook computer, but may correspond to other devices with a display member, such as a tablet computer. By making the camera 114 of the digital pen 110 available to be used with the computing device 120, for example, for videoconferencing, the display member 122 of the computing device 120 may be manufactured without a webcam. As an example, mounting a web camera along a top side or border of a display member of a computing device may require additional spacing along the top side, for example, 15-20 mm. In addition, cables for enabling the webcam, which may run from the base member of the computing device and along a side border of the display member, may require additional spacing along the side border of the display member, for example, at least 6.5 mm. However, by manufacturing the display member 122 without a webcam, the bezel of the display member 122 may be reduced, thereby reducing the dimensions of the top side 130 and the side border(s) 132. As an example, the bezel may be reduced to no more than 5 mm along the borders of the display member 122, including the top side 130 and the side border(s) 132. Reduction in the bezel of the display member 122 may be desirable for aesthetic purposes, and also to increase the surface area of the viewable display.

Referring to FIG. 1A, the digital pen 110 includes a barrel 112, with the camera 114 mounted along a length of the barrel 112. As illustrated, the camera 114 is mounted so that it points out from a side of the digital pen 110. Disposed within the digital pen 110 is a first set of magnetic members 116a-b for coupling with magnetic members disposed within the computing device 120. Referring to the computing device 120, at least a second set of magnetic members 126a-b and a third set of magnetic members 128a-b may be disposed within the computing device 120, for coupling with the first set of magnetic members 116a-b of the digital pen 110. As will be further described, the second set of magnetic members 126a-b may correspond to the area of the computing device 120 where the digital pen 110 may magnetically couple, for activating the camera 114, to be used by the computing device 120 for videoconferencing. The third set of magnetic members 128a-b may correspond to the area of the computing device 120 where the digital pen 110 may magnetically couple, but the camera 114 may remain deactivated. As an example, when the user attaches the digital pen 110 to the area of the computing device 120 where the third set of magnetic members 128a-b is disposed, the user may be intending to store the digital pen 110 to the computing device 120 and not have access to the camera 114.

Although two magnetic members are illustrated in each set found in the digital pen 110 and computing device 120, the number of magnetic members may vary. In addition, the number of sets of magnetic members found in the computing device 120, and their placement, may vary. For example, besides having just one set of magnetic members for activating the camera 114 when the digital pen 110 is magnetically attached to the computing device 120 (e.g., the second set of magnetic members 128a-b), there may be additional sets of magnetic members, for example, along a side border of the display member 122. In addition the third set of magnetic members 128a-b, where the digital pen 110 may be stored (and the camera 114 remains deactivated), may be found along a side of the base member 124, rather than along a side border of the display member 122, as illustrated.

Referring to FIG. 1B, magnetically coupling the first and second sets of magnetic members 116a-b, 126a-b with each other may activate the camera 114 for use with computing device 120 for videoconferencing, according to an example. Detection for attachment of the digital pen 110 to the computing device 120, in order to activate the camera 114, may vary. As an example, a Hall Effect sensor may be used for detecting the magnetic coupling of the first and second sets of magnetic members 116a-b, 126a-b. Referring to a first orientation of the digital pen 110 illustrated in FIG. 1A, the Hall Effect sensor may detect the presence of a magnetic field, for example, the magnetic field generated when magnetic member 116a is placed within proximity of the magnetic member 126a. The Hall Effect sensor 134 may be a part of the magnetic member 126a, or a separate element, as illustrated, which is within proximity of the magnetic member 126a to detect the magnetic field generated when the first set of magnetic members 116a-b is placed within proximity.

The Hall Effect sensor can respond to the presence (or absence) of the magnetic field by generating a signal. As an example, rather than detecting whether or not there is a magnetic field, the Hall Effect sensor may generate the signal based on whether the magnetic field is above or below a threshold value. This signal may then be used to activate or deactivate the camera 114 of the digital pen 110. As an example, as the digital pen 110 is placed within proximity of the computing device 120, for example, as the user is in the process of magnetically attaching the digital pen 110 to the computing device 120, although the Hall Effect sensor may detect a magnetic field, the Hall Effect sensor may generate the signal only after the magnetic field reaches or exceeds the threshold value (e.g., when the magnetic attachment between the digital pen 110 and the computing device 120 is completed). As an example, once the Hall Effect sensor generates the signal, wireless communications between the digital pen 110 and the computing device 120 may activate the camera 114 for use by the computing device 120 for videoconferencing.

Although the digital pen 110 may be battery-operated, power may be provided by the computing device 120 to charge the digital pen 110, once the digital pen 110 is magnetically attached to the computing device 120 (e.g., via either the second set of magnetic members 126a-b or the third set of magnetic members 128a-b). As an example, wireless inductive charging may be provided. However, a direct wired connection that is established when the digital pen 110 magnetically attaches to the computing device 120 may provide power as well. For example, the digital pen 110 may include a receptacle (not illustrated) to accommodate a connector (not illustrated) from computing device 120, to power the digital pen 110 when the first set of magnetic members 116a-b of the digital pen 110 is to be magnetically coupled to the second or third sets of magnetic members 126a-b, 128a-b of the computing device 120. In addition, activation of the camera 114 may occur from the direct wired connection, rather than signaling from the Hall Effect sensor, according to an example.

As an example, when an opposing force is provided by the user that is greater than the magnetic coupling between the first and second sets of magnetic members 116a-b, 126a-b, the digital pen 110 may detach from the computing device 120. The releasing force, or opposing force, required to overcome the magnetic coupling between the magnetic members may be determined by controlling the field strength of the magnetic members. Upon detachment, the Hall Effect sensor may then no longer detect the magnetic field generated between magnetic members 116a, 126a, or the magnetic field detected m fall below the threshold value. As a result, the Hall Effect sensor may either no longer generate the signal used above, or generate another signal, which is used to deactivate the camera 114 for use with the computing device 120. By using a mechanism such as the Hall Effect sensor, the camera 114 of the digital pen 110 may be activated or deactivated by physically attaching or detaching the digital pen 110 from the second set of magnetic members 126a-b, respectively. As a result, security concerns involved with camera hacking may be avoided, as described above.

Figure 1C:
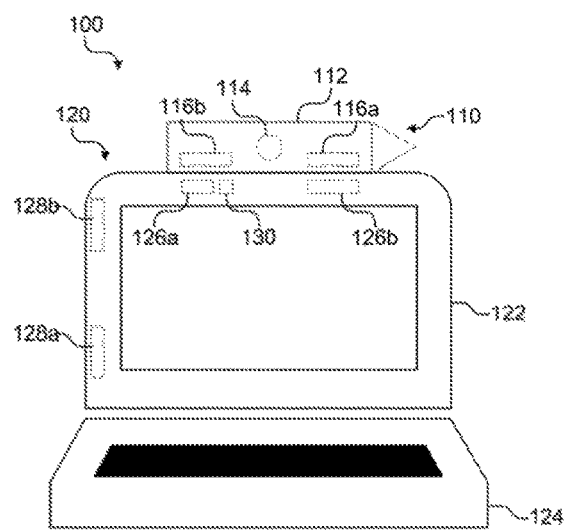

FIG. 1C illustrates a second orientation of the digital pen 110, where the camera is facing outward (world-facing mode), according to an example. By reversing the orientation from the first orientation illustrated in FIG. 18, the Hall Effect sensor may detect the presence of the magnetic field generated when magnetic member 116b is placed within proximity of the magnetic member 126a. As described above, the Hall Effect sensor can respond to the presence (or absence) of the magnetic field by generating a signal. As an example, rather detecting whether or not there is a magnetic field, the Hall Effect sensor may generate the signal based on whether the magnetic field is above or below a threshold value. This signal may then be used to activate or deactivate the camera 114 of the digital pen 110.

According to an example, magnetic polarities of the first and second sets of magnetic members 116a-b, 126a-b may provide for the digital pen 110 to be attachable to the computing device 120 in only a single orientation (e.g., the first orientation illustrated in FIG. 18). With regards to magnetic polarity, magnetic elements having the same polarity (e.g., N-N or S-S) may generate a negative or repulsive magnetic force, whereas those corresponding magnetic elements having opposite polarities (e.g., N-S) will generate a positive or attractive magnetic force. Referring to FIG. 18, a north pole of the magnetic member 116a of the digital pen 110 may generate a positive or attractive magnetic force with a south pole of the magnetic member 126a of the computing device 120. Similarly, a south pole of the magnetic member 116b of the digital pen 110 may generate a positive or attractive magnetic force with a north pole of the magnetic member 126b of the computing device 120. This positive or attractive magnetic force may be generated when the digital pen 110 is placed within proximity of the computing device 120.

As a result of controlling the magnetic polarities of the magnetic members, the digital pen 110 may only attach to the computing device 120 in a specific orientation. For example, it may not be desirable to attach the digital pen 110 to the computing device 120 in an orientation that is reversed from what is illustrated in FIG. 1 (e.g., 116b to 126a and 116a to 126b). Therefore, any attempt made to attach the digital pen 110 and computing device 120 in a reverse orientation may generate a repulsive magnetic force rather than an attractive magnetic force.

Referring to FIG. 10, magnetically coupling the first and third sets of magnetic members 116a-b, 128a-b with each other may cause the camera 114 to remain deactivated, according to an example. For example, when the user attaches the digital pen 110 to the area of the computing device 120 where the third set of magnetic members 128a-b is disposed, the user may be intending to store the digital pen 110 to the computing device 120 and not have access to the camera 114. As an example, the third set of magnetic members 128*a-b* may not include a Hall Effect sensor, similar to the Hall Effect sensor for the second set of magnetic members 126*a-b*. As a result, when the digital pen 110 is to magnetically attach to the computing device 120 via the third set of magnetic members 128*a-b*, no signal is generated to activate or deactivate the camera 114 and, thus, the camera 114 is to remain deactivated.

Figure 2:
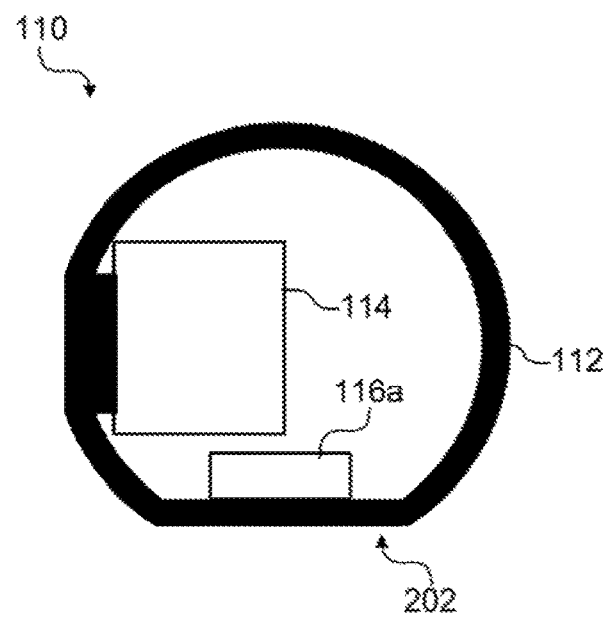
FIG. 2 illustrates a cross section of the digital pen, according to an example.

FIG. 2 illustrates a cross section of the digital pen 110 illustrated in FIG. 1A, according to an example. After magnetic attachment, as the digital pen 110 is to rest along an edge of either the display member 122 or base member 124, the digital pen 110 may include a flat surface 202 that provides stability as the digital pen 110 is magnetically attached to the computing device 120. As an example, the edge of either the display member 122 or base member 124 that accommodates the digital pen 110 may have a corresponding flat surface as well.

Figure 3:
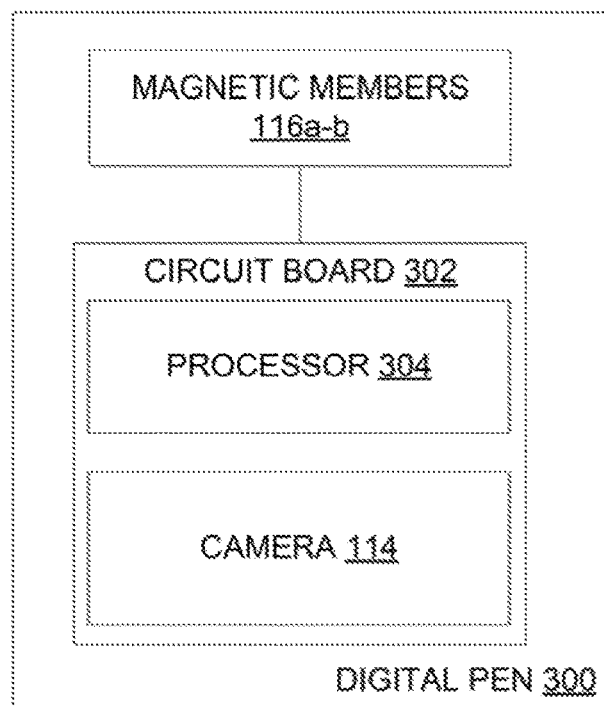
FIG. 3 illustrates internal components of a digital pen, according to an example.

FIG. 3 illustrates internal components of a digital pen 300, according to an example. Elements in FIG. 3 may share the reference numeral of similar elements of digital pen 110. As an example, Internal components of digital pen 300 may be used for activating or deactivating camera 114 to be used with a computing device (e.g., computing device 120), as will be further described. As described above, once the Hall Effect sensor of computing device 120 detects a magnetic field that indicates the magnetic members 114*a-b* of the digital pen is magnetically attached to a certain area of the computing device 120 (e.g., second set of magnetic members 126*a-b*), wireless communications between the digital pen and the computing device 120 may activate the camera of the digital pen for use by the computing device 120 for videoconferencing. However, a direct wired communication, as described above, may also activate the camera of the digital pen. Referring to FIG. 3, the wireless communications between digital pen 300 and the computing device 120 (or wired connection) may trigger a switch on a circuit board 302 to activate elements of the circuit board 302, such as the camera 114.

As used herein, a circuit board refers to a board which mechanically supports and electrically connects electronic components using conductive tracks, pads and/or other features. For instance, circuit board 302 may include copper tracks and conductive surfaces attached to a substrate. Various electrical components, such as capacitors and resistors, may be soldered to circuit board 302. As mentioned, circuit board 302 may be used to activate and deactivate the camera 114. As shown in FIG. 3, camera 114 may be coupled to circuit board 302. In some examples, circuit board 302 may control camera 114. Said differently, camera 114 may be activated via a switch on the circuit board 302. Thus, when the switch on the circuit board 302 is triggered by the wireless communications between digital pen 300 and the computing device 120 (or wired connection), circuit board 302 may activate camera 114. Camera 114 may be deactivated by the circuit board 302 in response to the Hall Effect sensor no longer detecting a magnetic field (or failing below a threshold). In such an example, the switch on the circuit board 302 may be triggered to deactivate the camera 114.

Digital pen 300 may further include a processor 304. Processor 304 may be a hardware processor such as a central processing unit (CPU), a semiconductor based microprocessor, and/or other hardware devices suitable for retrieval, reception, and/or execution of instructions. In some examples, processor 304 may be coupled to circuit board 302. In such examples, processor 304 may be activated upon activation of circuit board 302. That is, processor 304 may be activated when the switch on the circuit board 302 is triggered by the wireless communications between digital pen 300 and the computing device 120 (or wired connection). In some examples, processor 304 may be activated in response to activation of camera 114.

In some examples, processor 304 may be coupled to camera 114. In such examples, processor 304 may receive information and instructions from camera 114. For example, when camera 114 is activated, camera 114 may begin capturing video footage. Processor 304 may then receive the captured video footage from camera 114. In some examples, processor 304 may further transmit the video footage to a computing device (e.g., computing device 120) to be used for videoconferencing.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
   a digital pen comprising:
     a barrel;
     a camera mounted along a length of the barrel; and
     a first set of magnetic members, and
   a computing device comprising:
     a second set of magnetic members to magnetically couple with the first set of magnetic members of the digital pen, wherein when the first and second sets of magnetic members are to magnetically couple with each other, the camera is to activate for use with the computing device for videoconferencing.

2. The system of claim 1, wherein an opposing force to be provided by a user that is greater than the magnetic coupling between the first and second sets of magnetic members is to detach the digital pen from the computing device, wherein detaching the digital pen from the computing device is to deactivate the camera for use with the computing device.

3. The system of claim 1, wherein the computing device comprises a third set of magnetic members to magnetically couple with the first set of magnetic members of the digital pen, wherein when the first and third sets of magnetic members are to magnetically couple with each other, the camera is to remain deactivated for use with the computing device for videoconferencing.

4. The system of claim 3, wherein digital pen comprises a receptacle to accommodate a connector from the computing device, to power the digital pen when the first set of magnetic members of the digital pen is to be magnetically coupled to the second or third sets of magnetic members of the computing device.

5. The system of claim 1, wherein the first set of magnetic members of the digital pen is attachable to second set of magnetic members of the computing device in either a first or second orientation of the digital pen.

6. The system of claim 1, wherein the computing device comprises a Hall Effect sensor to detect when the first and second sets of magnetic members are to magnetically couple with each other or detach from each other.

7. The system of claim 6, wherein when the first and second sets of magnetic members are to magnetically couple with each other, the Hall Effect sensor is to generate a first signal to activate the camera for use with the computing device for videoconferencing.

8. The system of claim 7, wherein when the first and second sets of magnetic members are to detach from each other, the Hall Effect sensor is to generate a second signal to deactivate the camera for use with the computing device.

9. The system of claim 1, wherein magnetic polarities of the first and second sets of magnetic members provide for the digital pen to be attachable to the computing device in a single orientation.

10. A digital pen comprising:
   a barrel;
   a camera mounted along a length of the barrel;
   a first set of magnetic members;
   a circuit board disposed within the digital pen, wherein the circuit board is to activate the camera when the first set of magnetic members is to magnetically couple with a second set of magnetic members of a computing device; and
   a processor to transmit video footage from the activated camera to the computing device for videoconferencing.

11. The digital pen of claim 10, wherein the circuit board is to deactivate the camera when the first set of magnetic members is to no longer magnetically couple with the second set of magnetic members of the computing device.

12. The digital pen of claim 10, wherein the digital pen is to receive wireless communications from the computing device to activate the camera when the first set of magnetic members is to magnetically couple with the second set of magnetic members of the computing device.

13. The digital pen of claim 10, wherein magnetic polarities of the first set of magnetic members is to provide for the digital pen to be attachable to the computing device in a single orientation.

14. A system comprising:
   a digital pen comprising:
     a barrel;
     a camera mounted along a length of the barrel; and
     a first set of magnetic members; and
   a computing device comprising:
     a second set of magnetic members to magnetically couple with the first set of magnetic members of the digital pen; and
     a Hall Effect sensor to detect when the first and second sets of magnetic members are to magnetically couple with each other, wherein upon detection, the camera is to activate for use with the computing device for videoconferencing.

15. The system of claim 14, wherein when the Hall Effect sensor is to detect an absence of a magnetic field between the first and second sets of magnetic members, the camera is to deactivate for use with the computing device.

* * * * *